Patented May 14, 1946

2,400,395

UNITED STATES PATENT OFFICE 2,400,395

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, and Bernhard Keiser, Webster Groves, Mo., assignors to Petrolite Corporation, Ltd., Wilmington, Del., a corporation of Delaware No Drawing. Application December 14, 1944, Serial No. 568,229

16 Claims. (Cl. 252—8.55)

This invention relates to the art or procedure commonly referred to as acidization of oil-bearing, calcareous strata, or the like, and which consists in introducing a strong mineral acid into an oil well for the purpose of causing the acid to disintegrate, dissolve, or react with the calcareous, oil-bearing structure of the well, in a manner that results in an increase in the amount of crude petroleum obtained from the oil-bearing strata.

Many oil wells, after being subjected to acidization, produce emulsions, frequently of a very refractory nature, that have to be demulsified or subjected to chemical, electrical or similar treatment, in order to recover the oil or valuable constituent of the emulsion. Our invention has for its main object to prevent the formation of objectionable water-in-oil type emulsions resulting from acidization of oil wells, or stated in another way, one object of our invention is to provide a process or procedure, by which the oil-bearing, calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory, rather than a permanent, situation, but even if lasting only for a few weeks, are extremely objectionable.

Another object of our invention is to provide a new composition of matter, that is particularly adapted for use in the operation of acidizing the calcareous, oil-bearing strata of a well, inasmuch as said composition will react with or act upon the calcareous structure in a way to increase the amount of crude petroleum obtainable from said structure, without, however, converting said crude petroleum into an objectionable emulsion.

Our new process, briefly stated, consists in causing an emulsion-preventing agent of the kind hereinafter described, to be mixed with, dissolved in, or commingled with the fluids, liquids, or liquid mixture in an oil well that has been subjected to or which is being subjected to acidization, prior to emergence of said fluids, liquids, or liquid mixtures from the well. Said emulsion-preventing agent may be exemplified by the reaction product of two moles of 1,2-disubstituted glyoxalidine and 1 mole of urea. The compounds are described subsequently.

In practicing our process, the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing, or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent, along with the mineral acid, i. e., dissolved in said acid; and (c) Introducing the emulsion-preventing agent, preferably in aqueous solution, immediately after the introduction of the mineral acid.

The composition of matter that we have devised for acidizing the calcareous, oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. Our preference is to use hydrochloric acid, whose concentration is at least equal to approximately half strength commercial 18° Baumé acid, as we have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, we wish it to be understood that our invention, i. e., the new process and composition of matter herein described, is not restricted to the use of hydrochloric acid, but instead, contemplates the use of any suitable "strong mineral acid," several of which have previously been described as being useable in place of hydrochloric acid. Similarly, we wish it to be understood that the new composition of matter herein described may have other or additional uses, such, for example, as in the acidization of oil-bearing strata, which do not produce emulsions. The hydrochloric acid or the like that is employed, may or may not have present other addition agents intended to make the acid particularly adapted to meet localized conditions, which sometimes arise in the course of acidization. It should be emphasized that what is said hereinafter as to the utility and effectiveness of the composition of matter herein contemplated, applies with equal force and effect to the process which forms part of the present invention.

A number of problems have been involved in the introduction of strong mineral acid into oil-bearing strata of the kind containing calcium carbonate, magnesium carbonate, mixtures of the same, siliceous material, or material which is dolomitic in character, and commonly referred to as calcareous structures. One problem is the prevention of corrosion, or damage, to the metallic working parts of the well into which the acid is introduced. This has been overcome in various ways, such as by the use of an inhibitor. For the sake of brevity, reference is made to the following patents, which give a cross-sectional view of the art relating to acidization, although there are in addition certain other practical elements which are well known:

U. S. Patents No. 1,877,504, September 13, 1932, Grebe and Sanford; 1,891,667, December 20, 1932, Carr; 1,911,446, May 20, 1933, Grebe and Sanford; 1,990,969, February, 12, 1935, Wilson; 2,011,579, August 20, 1935, Heath and Fry; 2,024,718, December 17, 1935, Chamberlain; 2,038,956, April 28, 1936, Parkhurst; 2,053,285, September 8, 1936, Grebe; 2,128,160, August 23, 1938, Morgan; 2,128,161, August 23, 1938, Morgan; and 2,161,085, June 6, 1939, Phalen.

As has been previously stated, in the acidization of oil-bearing, calcareous strata, or the like, it has been found necessary, in some instances, to add certain other materials or compounds which give additional desirable effects, at least under certain conditions. For instances, hydrofluoric acid or fluorides have been added to intensify the action of the hydrochloric acid used to treat the well. Possibly this is related to the action on siliceous matter in the calcareous structure. The reason for the addition of inhibitors has been previously indicated. Sometimes it has been desirable to add tenacious, foam-producing agents, such as glue, gelatin, or the like. In other instances, it has been desirable to add calcium sequestering compounds, such as sodium hexametaphosphate. In other instances, reducing agents have been added to keep any dissolved iron salts in the ferrous state. Isopropyl alcohol, or the like, is sometimes added as a surface tension depressant. Thus, the addition of various other auxiliary agents, commonly referred to as addition agents, is well known.

We have found that the materials or products which we contemplate adding to the hydrochloric acid, or the like, to produce our new composition of matter, or to act as an emulsion-preventing agent in our new process, do not interfere in any manner with the functional effect of other conventional acidizing addition agents. Of course, any single example may contain no additional agent at all; or it may contain one or more, depending upon the particular local conditions and use. As far as we are aware, the herein contemplated compounds which are added to hydrochloric acid, or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions, when an oil well is turned into production, after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprizing situation, insofar that the spent acid results in a solution having approximately 20% of calcium chloride present, and having a pH value of approximately 3.5 to 5. On would expect the increased acidity, over that of most natural brines, to decrease the stability of the emulsion. One would also expect that the increased electrolyte content of the dispersed phase would decrease the stability of the emulsion. The increased specific gravity differential should have a similar destabilizing effect. Actually, in a number of instances, this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength or somewhat weaker, is usually diluted with an equal quantity of water before it is used for acidization; i. e., the acid used in acidization may vary from 14% to 16.5% HCl, although acid varying in strength from 5% to 20% HCl has been employed. It is entirely feasible to add an agent to the acid, as produced at the point of manufacture, thus exemplifying the composition of matter feature of the present invention. For instance, if desired, 0.02% to 5% of the contemplated agent may be added to the concentrated hydrochloric acid in manufacture. Such acid can be diluted to a suitable point before being employed in the acidization process. Thus, even concentrated acid can be diluted, for instance, half and half, so that the reagent is present in the dilute product within the ratio suggested previously, to wit, 0.01% to 2.5%. In many instances, the use of between 0.05% and 0.5% represents an acceptable average range.

In actual practice the hydrochloric acid obtained by a person or firm responsible for acidization operations, may be used, in some instances, on oil-bearing strata, which do not form severe or refractory emulsions, and thus, no advantage is obtained by adding a composition of the kind herein contemplated, in comparison with ordinary acid. Then too, some calcareous, oil-bearing strata which produces severe emulsions, may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acids, has been indicated.

As has been previously suggested, one may also add to the acid intended for acidization, various other reagents or addition products of the kind described in the aforementioned list of patents, without affecting the operation of the emulsion-preventing agent that we employ, and without danger of said emulsion-preventing agent interfering with the effectiveness of such other acidization addition products. Likewise, it has been indicated that one need not necessarily employ our emulsion-preventing agent in the form of an addition agent, which is added to or mixed with the acid used in the acidizing step. Instead, our emulsion-preventing agent may be introduced in suitable aqueous solution, preferably in fairly concentrated solution, for instance, 1–5%, prior to the acidizing step, or immediately after the acidizing step. The method of introduction is, of course, any conventional method, and preferably, employs the same apparatus and procedure used for introducing the acid. For convenience, however, and in the most preferred form, our invention is exemplified by employing, as an integral part, thereof, the composition of matter herein contemplated, to wit, hydrochloric acid, or the like, containing, in stable admixture, agents of the kind subsequently to be described and within the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing, roughly, equivalent to 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances, where such demulsifiers appear to meet all other requirements, they apparently precipitate out on the face of the pay sand or oil-bearing strata, and they may even reduce instead of increase the oil production, as compared with results obtained by ordinary acid. There are a number of other reasons not necessary to explain, which prevent ordinary demulsifiers from being effective. It is possible that the characteristic properties of our new composition of matter herein described, make it adaptable for uses in other arts with which we are not acquainted; but it may be apparent to others. It is also possible that the stable admixture of the kind described, i. e., certain agents dissolved in strong mineral acid, have other properties which we have not investigated, and in view of such properties, such mixture is particularly adaptable for the particular use herein described.

The substances or materials previously referred to, as emulsion preventive agents, which we employ in our new process and in our new composition of matter, consist of the reaction product involving two moles of 1,2-disubstituted glyoxalidine and one or more moles of urea, or the equivalent, thereof. The reaction involved eliminates ammonia with the formation of the corresponding substituted urea. Assuming the reaction involves two terminal amino nitrogen groups, it may be indicated, for the sake of brevity, in the following manner:

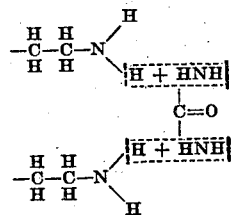

The linkage formed involves two amino nitrogen atoms connected by the divalent carboxy radical. It is known, however, that two moles of urea may combine to give a mole of biuret, or, if desired, biuret itself may be used to replace urea. Other comparable compounds, as well as biuret, may be used as the obvious equivalent of urea, for instance, thiourea, or guanidine carbonate. As to the use of such other reactants in somewhat analogous reactions, reference is made to U. S. Patent No. 2,304,113, dated December 8, 1942, to Morgan et al., and U. S. Patent No. 2,304,369, dated December 8, 1942, to Morgan et al.

As previously suggested, one type of raw material herein contemplated, consists of a cyclic compound having a 5-membered heterocyclic ring with two atoms different from carbon. More specifically, they may be considered as derivatives of imidazole, frequently referred to as glyoxaline. Imidazole (glyoxaline) is indicated by the following formula:

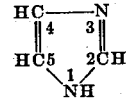

The imidazolines or glyoxalidines may be considerede as dihydro-derivatives of imidazole (glyoxaline); and thus, the expressions "dihydroglyoxalines" and "glyoxalidines" are often employed. The introduction of two hydrogen atoms at the 4-5 position results in the conversion of imidazole into dihydroglyoxaline, which may be indicated by the following formula:

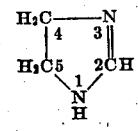

As to the manufacture of imidazolines, reference is made to the following patents: U. S. Patents Nos. 2,215,861, 2,215,862, 2,215,863 and 2,215,864, dated September 24, 1940, to Waldmann and Chwala.

Imidazolines or glyoxalidines may be regarded as dehydration products of certain amides; and they may be obtained by reacting polyamines and the higher carboxylic acids, under certain conditions. The formation of these glyoxalidine compounds, while forming no part of the present invention, is indicated by the following scheme:

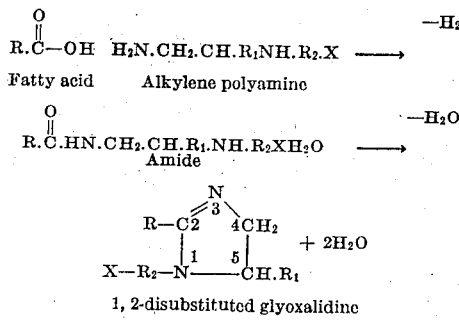

1, 2-disubstituted glyoxalidine wherein R represents an alkyl or alkenyl group, such as one containing from 10 to 20 carbon atoms (the residue of a higher fatty acid); $R_1$ represents hydrogen or a lower alkyl group; $R_2$ represents an alkylene group, or a lower alkyl substituted alkylene group, and X represents a hydroxyl group, an amino group, or an aminoalkylene substituted amino group. (See U. S. Patent No. 2,214,152, dated September 10, 1940, to Wilkes. See also U. S. Patents Nos. 2,155,877 and 2,155,878, both dated April 25, 1939, to Waldmann and Chwala.)

The expression "higher molecular weight carboxy acids" is an expression frequently employed to refer to certain organic acids, particularly monocarboxy acids, having more than 6 carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term, previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, heptylic acid, caproic acid, capric acid, pimelic acid, sebacic acid, erucic acid, saturated and unsaturated, higher molecular weight, aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetylricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, and other fish oils, teaseed oil, partially or completely hydrogenated animal and vegetable oils, such as those mentioned; hydroxy and alpha-hydroxy, higher carboxylic, aliphatic and fatty acids, such as hydroxystearic acid, dihydroxypalmitic acid, dihydroxystearic acid, dihydroxybehenic acid, alpha-hydroxy caproic acid, alpha-hydroxystearic acid, alpha-hydroxy palmitic acid, alpha-hydroxy lauric acid, alpha-hydroxy myristic acid, alpha-hydroxy cocoanut oil mixed fatty acids, alpha-hydroxy margaric acid, alpha-hydroxy arachidic acid, and the like, fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy-diphenyl, naphthenic, and abietic acid; aralkyl and aromatic acids, such as hexahydrobenzoic acid, hydrogenated naphthoic, hydrogenated polycarboxyl-diphenyl, naphthenic, and abietic acid; aralkyl and aromatic acids, such as benzoic acid, Twitchell fatty acids, naphthoic acid, carboxy-diphenyl, pyridine carboxylic acid, hydroxy-benzoic acid, and the like.

Other suitable acids include phenylstearic acid, benzoylnonylic acid, campholic acid, fencholic acid, cetyloxybutyric acid, cetyloxyacetic acid, chlorstearic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

The preferred aspect of our invention is concerned with the use of compounds derived from detergent-forming monocarboxy acids, which include those previously described, having at least 8 carbon atoms and not more than 32 carbon atoms. The preferred reagent in this particular case consists of the higher fatty acids, and more especially, the unsaturated, higher fatty acids.

In order to illustrate the invention, the following examples are given of procedures that we have employed to produce our new composition of matter, although obvious varieties can be prepared, in light of the class of reagents previously enumerated.

*Example 1*

1-aminoethyl-2-heptadecenyl glyoxalidine was prepared by mixing 1 gram mole (282 grams) of oleic acid, with 2 gram moles (206 grams) of diethylene triamine, and heating the mixture for a period of about 16 hours, under a distilling column. Water was continuously removed until a temperature of about 245° C. was reached. The quantity of water thus removed amounted to about 1.7 moles. Unreacted diethylene triamine was distilled from the reaction mixture, under vacuum, and the residue then was purified by distillation at an absolute pressure of 1 mm. of mercury, at which point it boiled within a temperature range of 225° to 250° C. About 220 grams of the 1-aminoethyl-2-heptadecyl glyoxalidine was obtained as a pale yellow liquid.

2 lb. moles of the above product are mixed with 1 lb. mole of urea and heated at a temperature within the range of 120° C. to approximately 160° C. until 2 moles of ammonia are eliminated. This requires approximately 20 minutes to 1 hour. The product so obtained is somewhat darker in appearance, and much more viscous than the product prior to reaction with urea. It is soluble in water, dilute acids, etc.

Example 2

The same procedure is followed as in the preceding example, except that a different disubstituted glyoxalidine is employed, to wit, 1-(aminoethyl ethylamino)-2-heptadecenyl glyoxalidine. This glyoxalidine was prepared by reacting 1 gram mole of oleic acid with 3 gram moles (438 grams) of triethylene tetramine.

The molal ratio of glyoxalidine to urea is left unchanged.

Example 3

Tetraethylenepentamine is substituted for triethylenetetramine as a reactant in the preceding example.

Example 4

Lauric acid is substituted as a reactant for oleic acid in the three preceding examples.

Example 5

Ricinoleic acid is substituted for oleic acid in Examples 1-3, preceding.

Example 6

Naphthenic acid is substituted for oleic acid in Examples 1-3, preceding.

Example 7

The same procedure is followed as in Examples 2 to 6, inclusive, except the molal ratio of urea is doubled.

Example 8

The same procedure is followed as in Examples 2 to 6, inclusive, except that the molal ratio of urea is tripled.

Example 9

The same procedure is followed as in Examples 1 to 6, inclusive, except that thiourea, biuret or guanidine carbonate, is substituted for urea.

It has been previously pointed out that where urea is employed in the proportion of 1 mole of urea for 2 of the glyoxalidine, that the structure involves a linkage, such as the following:

$$-NHCH_2CH_2-NH$$
$$\quad\quad\quad\quad C=O$$
$$-NHCH_2CH_2-NH$$

When, however, 2 moles of urea are employed for 2 moles of the glyoxalidine, a variety of other structures may enter into the combination, as, for example, the formation of biuret, with the result that there appears a linkage such as the following:

$$-N-$$
$$C=O$$
$$NH$$
$$C=O$$
$$-N-$$

However, cyclic structures may be formed, due to the formation of two cross-linked structures, as indicated by the following:

$$-N-CH_2CH_2-NH$$
$$C=O \quad\quad C=O$$
$$-N-CH_2CH_2-NH$$

It is entirely possible, however, and seems indicated by some of the thick, resinous products formed, that polymerization occurs when the higher properties of urea, or its equivalent, are employed, due to the formation of a structure, as indicated in the following manner:

$$\begin{array}{c} H \\ -NCH_2CH_2NH \\ \quad\quad C=O \\ -NCH_2CH_2NH \\ \vdots H\ \vdots \\ \vdots + \vdots \\ \vdots HN\vdots \\ \vdots H\ \vdots \\ \quad\quad C=O \\ \vdots H\ \vdots \\ \vdots HN\vdots \\ \vdots + \vdots \\ \vdots H\ \vdots \\ -NCH_2CH_2NH \\ \quad\quad C=O \\ -NCH_2CH_2NH \\ H \end{array}$$

So far as we are aware, the reaction involving two moles of the glyoxalidine and 1 mole of the urea involves the terminal primary amino radicals. When additional linkages are formed, as indicated, provided that such linkages may take place in more than one position, we are unaware as to the factors which determine the particular point of reaction.

In order to properly designate the herein contemplated compounds, we have referred to them as substituted carbamyl compounds containing at least 2 radicals of the 1,2-disubstituted glyoxalidine:

$$\begin{array}{c} N \\ R-C_2^{\ 3}\ \ 4CH_2 \\ \quad | \quad\quad\ | \\ X-R_2-N-\!\!\!-\!\!\!-CH.R_1 \\ \quad\quad\quad 1 \quad 5 \end{array}$$

wherein R represents an alkyl or alkenyl group, such as one containing from 10 to 20 carbon atoms (the residue of a higher fatty acid or its equivalent); $R_1$ representing hydrogen or a lower alkyl group; $R_2$ represents an alkylene group or a lower alkyl substituted group; and X represents a member of the class consisting of amino groups and amino-alkylene substituted amino groups, and having at least one occurrence of a divalent radical selected from the class consisting of:

$$C=O; \quad C=S; \quad C=NH \quad \text{and} \quad \begin{array}{c} C=O \\ | \\ NH \\ | \\ C=O \end{array}$$

radicals, and the aforementioned divalent radical uniting the glyoxalidine radicals by being linked to nitrogen atoms.

Compounds of the type herein described are basic in form, and it is understood that reference in the claims includes the free base, i. e., the anhydro form, or the hydrated base formed by combination with water or salts formed by combination with organic or inorganic acids, such as citric acid, lactic acid, hydroxyacetic acid, nitric acid, hydrochloric acid, etc.

Attention is directed to U. S. Patent No. 2,353,706, dated July 18, 1944, to De Groote and Keiser. Said patent describes the oxyalkylation, and particularly the oxyethylation of 1,2-disubstituted glyoxalidine of the type herein contemplated as reactants. It is understood that the products herein contemplated may be subjected to oxyethylation under the same conditions, and in the same manner, and in the same molal ratio, as the simpler 1,2-disubstituted glyoxalidine, as described in the aforementioned U. S. Patent No.

2,353,706. Furthermore, one may react the oxy-alkylated 1,2-disubstituted glyoxalidine with urea, thiourea, or other reactants of the kind herein described, and obtain somewhat analogous compounds, although the reactions appear to be complicated by the fact that reactions involving the following groups appear to take place to a greater or lesser degree, particularly when both hydrogen atoms attached to the terminal amino nitrogen atom have been subjected to oxyethylation, as indicated in the following manner:

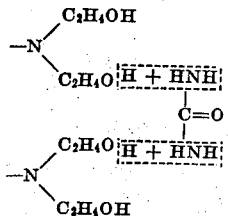

The above product appears to form linkages which represent a particular type of carbonic acid ester.

However, when there is one hydrogen atom attached to an amino nitrogen atom available for reaction, the following reaction appears to predominate:

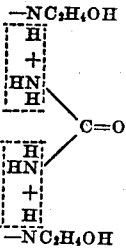

In this instance, the final product appears largely to conform to that obtained by initial reaction with urea, followed by oxyethylation as a subsequent step. Oxyalkylation, particularly oxyethylation, need not be limited to 2 amino radicals, but may be employed for the modification of a single amino radical, or for more than 2 amino radicals. There must be a hydrogen atom attached to the amino radical, i. e., the amino radical must be primary or secondary, in order to be susceptible to oxyalkylation.

In its broadest aspect, the present invention contemplates such variants in which the imidazoline radical contains a group selected from the class consisting of —N—(R₃—O)ₙH and —NH—(R₃—O)ₙH— groups; wherein R₃ denotes an aliphatic radical and n is a small whole number greater than 2 and less than 11; or the equivalent radicals previously mentioned in connection with hydroxy ethylene derivatives and which may be indicated in a broader aspect by the following structure:

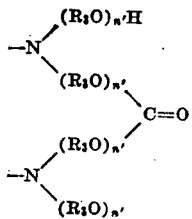

wherein R₃ has its previous significance and n' is a small whole number less than 11. R₃ particularly represents alkylene radicals having 2 to 4 carbon atoms, such as the ethylene radical, propylene radical, butylene radical, glycide radical and methyl glycide radical.

Substantially all of the chemical compounds previously described are water-soluble. For this reason, they can be used without difficulty in aqueous solution as an emulsion-preventing agent by injecting such aqueous solution into the oil-bearing strata prior to acidization, or immediately after acidization. Such injection is made by conventional means, as, for example, the same apparatus or mechanical device employed for injecting acid into the well or oil-bearing strata. Furthermore, substantially all of the compounds above described are soluble in hydrochloric acid of a strength corresponding to approximately 15%.

Furthermore, substantially all of the compounds of the type indicated are soluble in concentrated hydrochloric acid. Commercial hydrochloric acid is ordinarily available in grades from approximately 18° Baumé, corresponding to approximately 28% anhydrous acid, to 22° Baumé, corresponding to approximately 35.2% anhydrous acid. Some commercial hydrochloric acid is available in a strength which approximates the C. P. grade, or slightly less than 37% anhydrous acid.

Needless to say, our new composition of matter can be prepared readily in any convenient manner. The selected compound may be dissolved in concentrated hydrochloric acid without dilution. The percentages employed have already been indicated. Such a concentrated hydrochloric acid may or may not contain some hydrofluoric acid. Likewise, if desired, the emulsion-preventing agent may be dissolved in water, and such aqueous solution added to the hydrochloric acid or the like, in order to dilute the same to the desired concentration. Another procedure, of course, is to dilute the hydrochloric acid to the desired concentration and add the particular chemical compound which has been selected as the emulsion-preventing agent. The percentage of chemical compound of the kind herein described is added within the range of 0.01% to 5%.

Having thus described our invention, what we claim as new and desire to secure by Letters Patent is:

1. A process for preventing water-in-oil type emulsions resulting from acidization of calcareous, oil-bearing strata, which consists in introducing into the cognate fluids of a well, prior to emergence, a water-soluble member of the class consisting of: (A) substituted carbamyl compounds containing at least 2 glyoxalidine radicals; said glyoxalidine radicals being the radical of a 1,2-disubstituted glyoxalidine of the structure:

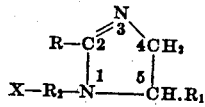

wherein R is the radical of the detergent-forming monocarboxy acid having at least 8 and not more than 32 carbon atoms; R₁ is a member of the class consisting of hydroxyl radicals, amino radi-alkyl radicals; R₂ is a member of the class consisting of alkylene radicals and lower alkyl-substituted, alkylene radicals; X is a member of the class consisting of hydroxyl radicals, amino radicals and amino, alkylene-substituted, amino radicals; in said carbamyl compound the aforementioned 1,2-disubstituted glyoxalidine radicals being united by at least one member selected from the class consisting of the divalent

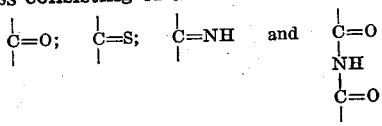

radicals; and the aforementioned divalent radical uniting the glyoxalidine radicals by being linked to nitrogen atoms; and (B) oxyalkylated derivatives of the aforementioned carbamyl compounds in which there is at least one occurrence of the radical $(R_3O)_{n'}$, in which $R_3$ represents an alkylene radical having 2 to 4 carbon atoms, and $n'$ is a small whole number less than 11.

2. The process of claim 1, wherein R is the radical of a higher fatty acid.

3. The process of claim 1, wherein R is the radical of a higher fatty acid having 18 carbon atoms.

4. The process of claim 1, wherein R is the radical of an unsaturated, higher fatty acid having 18 carbon atoms.

5. The process of claim 1, wherein R is the radical of an unsaturated, higher fatty acid having 18 carbon atoms and the ratio of glyoxalidine radicals to radicals selected from the class consisting of:

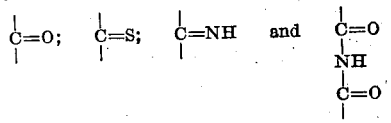

radicals being 2 to 1.

6. The process of claim 1, wherein R is the radical of an unsaturated, higher fatty acid having 18 carbon atoms; the ratio of glyoxalidine radicals to radicals selected from the class consisting of

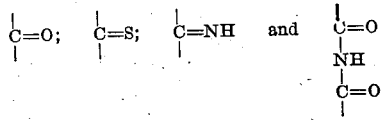

radicals being 2 to 1, and the number of nitrogen atoms in each glyoxalidine radical being 3.

7. The process of claim 1, wherein R is the radical of an unsaturated, higher fatty acid having 18 carbon atoms; the ratio of glyoxalidine radicals to radicals selected from the class consisting of:

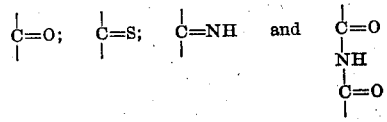

radicals being 2 to 1, and the number of nitrogen atoms in each glyoxalidine radical being 4.

8. The process of claim 1, wherein R is the radical of an unsaturated, higher fatty acid having 18 carbon atoms; the ratio of glyoxalidine radicals to radicals selected from the class consisting of:

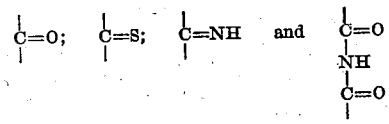

radicals being 2 to 1, and the number of nitrogen atoms in each glyoxalidine radical being 5.

9. A composition of matter, comprising hydrochloric acid whose concentration is at least equal to approximately half strength commercial 18° Baumé acid, and a water-soluble member of the class consisting of: (A) substituted carbamyl compounds containing at least 2 glyoxalidine radicals; said glyoxalidine radicals being the radical of a 1,2-disubstituted glyoxalidine of the structure:

$$R-C_2^{\overset{N}{\underset{1}{\parallel}}3}\!\!\!\diagdown\!\!4CH_2$$
$$X-R_2-N\underset{5}{\rule{1.5em}{0.4pt}}CH.R_1$$

wherein R is the radical of the detergent-forming monocarboxy acid having at least 8 and not more than 32 carbon atoms; $R_1$ is a member of the class consisting of hydrogen atoms and lower alkyl radicals; $R_2$ is a member of the class consisting of alkylene radicals and lower alkyl-substituted, alkylene radicals; X is a member of the class consisting of hydroxyl radicals, amino radicals and amino, alkylene-substituted, amino radicals; in said carbamyl compound the aforementioned 1,2-disubstituted glyoxalidine radicals being united by at least one member selected from the class consisting of the divalent

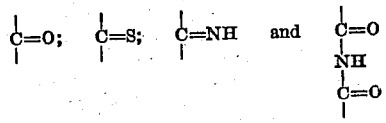

radicals; and the aforementioned divalent radical uniting the glyoxalidine radicals by being linked to nitrogen atoms; and (B) oxyalkylated derivatives of the aforementioned carbamyl compounds, in which there is at least one occurrence of the radical $(R_3O)_{n'}$, in which $R_3$ represents an alkylene radical having 2 to 4 carbon atoms, and $n'$ is a small whole number less than 11, the percentage of said carbamyl compound being within the range of 0.01% to 5%.

10. The acidic composition of matter of claim 9, wherein R of the carbamyl compound is the radical of a higher fatty acid.

11. The acidic composition of matter of claim 9, wherein R of the carbamyl compound is the radical of a higher fatty acid having 18 carbon atoms.

12. The acidic composition of matter of claim 9, wherein R of the carbamyl compound is the radical of an unsaturated, higher fatty acid having 18 carbon atoms.

13. The acidic composition of matter of claim 9, wherein R of the carbamyl compound is the radical of an unsaturated, higher fatty acid having 18 carbon atoms and the ratio of glyoxalidine radicals to radicals selected from the class consisting of:

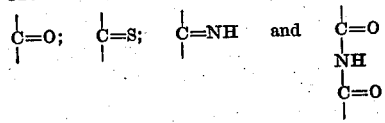

radicals being 2 to 1.

14. The acidic composition of matter of claim 9, wherein R of the carbamyl compound is the radical of an unsaturated, higher fatty acid having 18 carbon atoms; the ratio of glyoxalidine radicals to radicals selected from the class consisting of:

$$\underset{|}{\overset{|}{C}}=O; \quad \underset{|}{\overset{|}{C}}=S; \quad \underset{|}{\overset{|}{C}}=NH \quad \text{and} \quad \underset{\underset{|}{C=O}}{\overset{|}{\underset{NH}{\overset{|}{C}=O}}}$$

radicals being 2 to 1, and the number of nitrogen atoms in each glyoxalidine radical being 3.

15. The acidic composition of matter of claim 9, wherein R of the carbamyl compound is the radical of an unsaturated, higher fatty acid having 18 carbon atoms; the ratio of glyoxalidine radicals to radicals selected from the class consisting of:

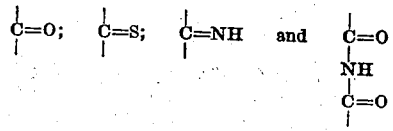

radicals being 2 to 1, and the number of nitrogen atoms in each glyoxalidine radical being 4.

16. The acidic composition of matter of claim 9, wherein R of the carbamyl compound is the radical of an unsaturated, higher fatty acid having 18 carbon atoms; the ratio of glyoxalidine radicals to radicals selected from the class consisting of

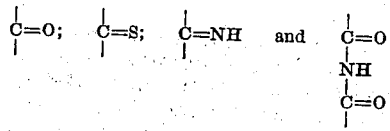

radicals being 2 to 1, and the number of nitrogen atoms in each glyoxalidine radical being 5.

MELVIN DE GROOTE.
    BERNHARD KEISER.